US010578181B2

(12) United States Patent
Street

(10) Patent No.: US 10,578,181 B2
(45) Date of Patent: Mar. 3, 2020

(54) FLEXIBLE SPRING MEMBERS AS WELL AS GAS SPRING ASSEMBLIES AND METHODS OF MANUFACTURE

(71) Applicant: Firestone Industrial Products Company, LLC, Nashville, TN (US)

(72) Inventor: Stephen C. Street, Mount Juliet, TN (US)

(73) Assignee: Firestone Industrial Products Company, LLC, Nashville, TN (US)

(*) Notice: Subject to any disclaimer, the term of this patent is extended or adjusted under 35 U.S.C. 154(b) by 0 days.

(21) Appl. No.: 15/774,198

(22) PCT Filed: Nov. 9, 2016

(86) PCT No.: PCT/US2016/061191
§ 371 (c)(1),
(2) Date: May 7, 2018

(87) PCT Pub. No.: WO2017/083427
PCT Pub. Date: May 18, 2017

(65) Prior Publication Data
US 2018/0328436 A1    Nov. 15, 2018

Related U.S. Application Data

(60) Provisional application No. 62/253,126, filed on Nov. 9, 2015.

(51) Int. Cl.
*F16F 9/04*    (2006.01)
*B60G 11/27*    (2006.01)

(52) U.S. Cl.
CPC ............ *F16F 9/0463* (2013.01); *B60G 11/27* (2013.01); *B60G 2202/152* (2013.01); *B60G 2206/424* (2013.01)

(58) Field of Classification Search
CPC ....... F16F 9/0463; F16F 9/0454; B60G 11/27; B60G 2206/424; B60G 2204/126
USPC ...................................................... 267/64.27
See application file for complete search history.

(56) References Cited

U.S. PATENT DOCUMENTS

| 3,895,787 | A | * | 7/1975 | Niehus | ...................... | B61F 5/10 |
| | | | | | | 105/198.1 |
| 4,784,376 | A | * | 11/1988 | Ecktman | ............... | B29C 65/568 |
| | | | | | | 267/64.27 |
| 4,787,606 | A | * | 11/1988 | Geno | .................... | F16F 9/0463 |
| | | | | | | 267/64.24 |

(Continued)

FOREIGN PATENT DOCUMENTS

| EP | 1429045 | 6/2004 |
| EP | 1736683 | 12/2006 |

OTHER PUBLICATIONS

International Search Report and Written Opinion for corresponding PCT Application No. PCT/US2016/061191 dated Feb. 1, 2017.

*Primary Examiner* — Thomas W Irvin
(74) *Attorney, Agent, or Firm* — Brian D. McAlhaney; Matthew P. Dugan

(57) ABSTRACT

A flexible spring member and bead guard assembly. A gas spring assembly including a flexible spring member with a mounting bead and a bead guard disposed along the mounting bead. A method of manufacturing a gas spring assembly includes providing bead guard, and securing the bead guard along a flexible spring member.

20 Claims, 11 Drawing Sheets

(56) References Cited

U.S. PATENT DOCUMENTS

| | | | | |
|---|---|---|---|---|
| 4,787,607 A * | 11/1988 | Geno | ............... | F16F 9/0454 |
| | | | | 267/64.11 |
| 4,832,317 A * | 5/1989 | Alaphilippe | ........ | B29C 66/5344 |
| | | | | 156/73.1 |
| 4,946,144 A | 8/1990 | Geno | | |
| 5,005,808 A * | 4/1991 | Warmuth, II | ......... | F16F 9/0463 |
| | | | | 267/122 |
| 5,201,500 A * | 4/1993 | Ecktman | ............... | B60G 7/04 |
| | | | | 267/140 |
| 5,671,907 A * | 9/1997 | Arnold | ............... | F16F 9/0454 |
| | | | | 267/64.27 |
| 6,361,028 B1 * | 3/2002 | Hubbell | ............... | F16F 9/0409 |
| | | | | 267/64.19 |
| 6,942,201 B2 * | 9/2005 | Leonard | ............... | F16F 9/0454 |
| | | | | 267/64.19 |
| 6,957,806 B2 * | 10/2005 | Tubbs | ............... | B60G 7/04 |
| | | | | 267/122 |
| 7,328,887 B2 * | 2/2008 | Leonard | ............... | B60G 11/28 |
| | | | | 267/122 |
| 8,899,561 B2 * | 12/2014 | Koeske | ............... | B60G 11/27 |
| | | | | 267/122 |
| 9,556,922 B2 * | 1/2017 | Egolf | ............... | B60G 11/27 |
| 2008/0143027 A1 * | 6/2008 | Knevels | ............... | F16F 9/0454 |
| | | | | 267/64.11 |
| 2014/0091548 A1 | 4/2014 | Ratz | | |
| 2016/0059655 A1 * | 3/2016 | Binder | ............... | F16F 9/0454 |
| | | | | 267/64.27 |
| 2016/0121682 A1 * | 5/2016 | Leonard | ............... | F16F 9/04 |
| | | | | 280/124.161 |
| 2016/0153513 A1 * | 6/2016 | Nieten | ............... | F16F 9/0409 |
| | | | | 267/64.27 |

* cited by examiner

FLEXIBLE SPRING MEMBERS AS WELL AS GAS SPRING ASSEMBLIES AND METHODS OF MANUFACTURE

BACKGROUND

The subject matter of the present disclosure broadly relates to the art of gas spring devices and, more particularly, to constructions that include a bead guard disposed along a mounting bead of a flexible spring member. Gas spring assemblies including such constructions as well as suspension systems including one or more of such gas spring assemblies and methods of manufacture are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the range of motion of a suspension system extends between a first or fully compressed condition of one or more of the spring elements and a second or fully extended condition of one or more of the spring elements. Additionally, many suspension geometries allow the suspension components to move laterally and/or articulate at an angle relative to one another. To eliminate contact between opposing portions of the sprung and unsprung masses, contact between opposing portions of components of the suspension system or contact between any combination thereof during such suspension displacement, jounce bumpers are commonly installed on one or more portions of the vehicle to prevent such opposing portions from directly impacting one another. Thus, during jounce motion of the suspension system, an opposing component will contact the jounce bumper rather than impacting the component on or near which the jounce bumper is mounted.

Jounce bumpers of a variety of types, kinds and configurations have been developed and are commonly used. In some cases, one or more jounce bumpers can be secured in an external or exposed condition between opposing structural components of the vehicle. In other cases, suspension systems can include gas spring devices that include a spring chamber containing a quantity of pressurized gas as a working medium. In such cases, a jounce bumper can be disposed within the spring chamber of one or more of the gas spring devices. In some cases, the lateral and/or articulating travel of the suspension system can result in an undesirable interaction between the jounce bumper and other non-load bearing components of the gas spring device, which can undesirably influence the performance and/or other characteristics of such components.

Notwithstanding the widespread usage and overall success of conventional gas spring constructions, it is believed that a need exists to address the foregoing and/or other challenges while still retaining comparable or improved performance, ease of manufacture, ease of assembly, ease of installation, reduced cost of manufacture, and/or otherwise advancing the art of gas spring devices.

BRIEF SUMMARY

One example of a flexible spring member and bead guard assembly in accordance with the subject matter of the present disclosure is dimensioned for securement between associated end members to at least partially define a spring chamber. The assembly can include a flexible spring member that can have a longitudinal axis and can extend peripherally about the longitudinal axis between a first end and a second end that is spaced longitudinally from the first end. The flexible spring member can include a flexible wall at least partially formed from an elastomeric material. The flexible wall can include a mounting bead disposed along the first end. The mounting bead can be at least partially formed from the elastomeric material of the flexible wall and can include an annular reinforcing element at least partially embedded therein. A bead guard can be disposed along the first end of the flexible spring member with at least a portion of the mounting bead disposed radially inward of the mounting bead. As such, the portion of the bead guard can extend longitudinally along the mounting bead and can, in some cases, be secured along the mounting bead of the flexible spring member.

One example of a gas spring assembly in accordance with the subject matter of the present disclosure can include a flexible spring member having a longitudinal axis. The flexible spring member can extend peripherally about the longitudinal axis between a first end and a second end that is spaced longitudinally from the first end. The flexible spring member can include a flexible wall that is at least partially formed from an elastomeric material with a mounting bead disposed along the first end. A first end member can be secured across the first end of the flexible spring member such that a substantially fluid-tight seal is formed therebetween. A bead guard can be disposed radially inward of the mounting bead and can extend longitudinally therealong.

One example of a suspension system in accordance with the subject matter of the present disclosure can include a pressurized gas system that includes a pressurized gas source and a control device. The suspension system can also include at least one gas spring assembly according to the foregoing paragraph. The at least one gas spring assembly can be disposed in fluid communication with the pressurized gas source through the control device such that pressurized gas can be selectively transferred into and out of the spring chamber.

One example of a method of manufacturing a gas spring assembly in accordance with the subject matter of the present disclosure can include providing a flexible spring member having a longitudinal axis and extending peripherally about the longitudinal axis between a first end and a second end spaced longitudinally from the first end. The flexible spring member can include a flexible wall at least partially formed from an elastomeric material and a mounting bead disposed along the first end. The method can also include providing a bead guard formed from a comparatively rigid material relative to the elastomeric material of the flexible wall. The method can further include positioning the bead guard radially inward of the mounting bead such that at least a portion of the bead guard extends longitudinally therealong. The method can also include providing a first end member and positioning the first end member along the first end of the flexible spring member. The method can further include securing the bead guard and the first end member along the mounting bead such that a substantially fluid-tight seal is formed between the first end member and the flexible spring member.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
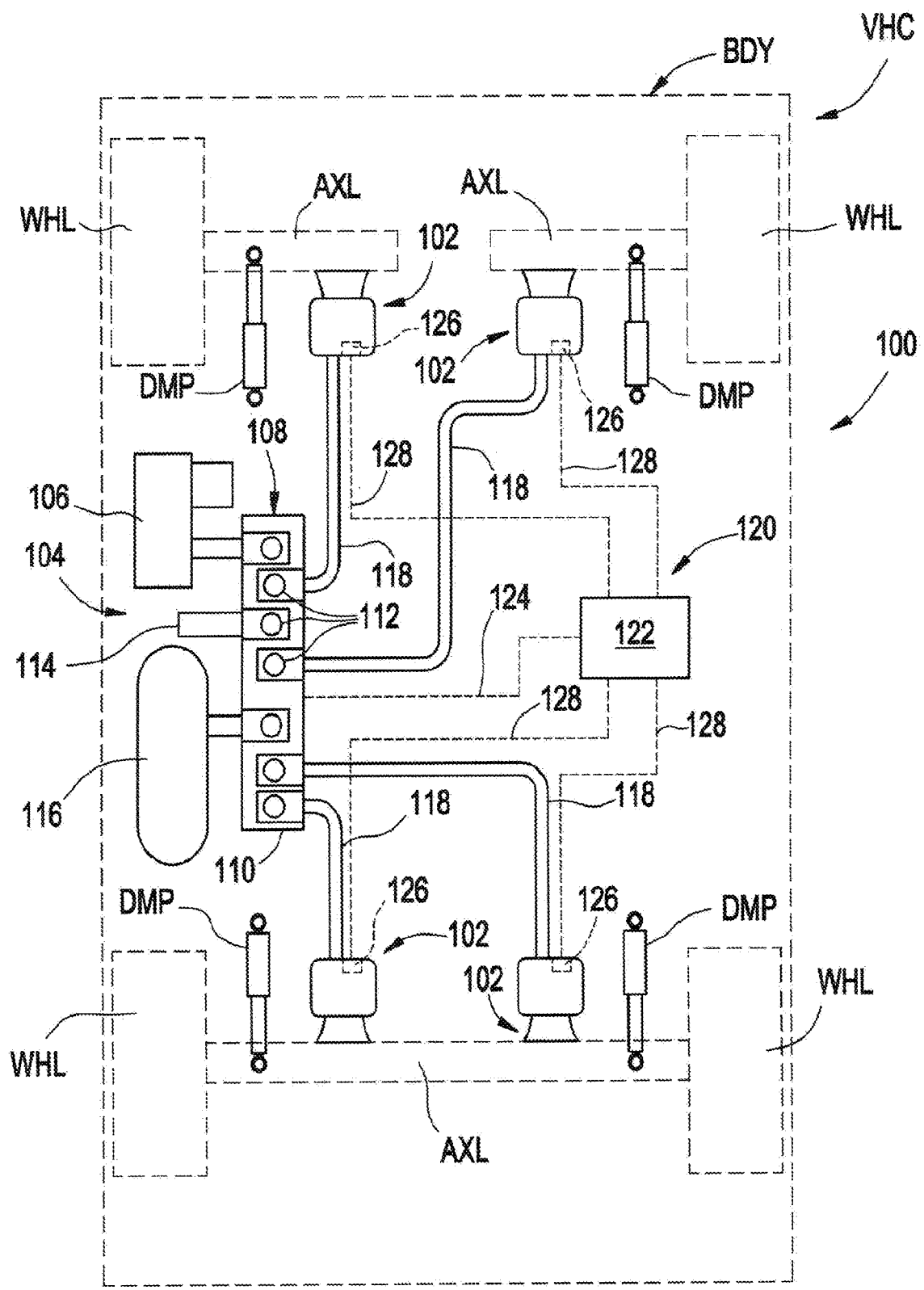
FIG. 1 is a schematic representation of one example of a suspension system of an associated vehicle that includes one or more gas spring assemblies in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can also optionally include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also optionally include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Such height sensing devices can be in communication with ECU 122, which can receive the height or distance signals therefrom.

The height sensing devices can be in communication with ECU 122 in any suitable manner, such as through conductors or leads 128, for example. Additionally, it will be appreciated that the height sensing devices can be of any suitable type, kind and/or construction.

Having described an example of a suspension system (e.g., suspension system 100) that can include gas spring assemblies in accordance with the subject matter of the present disclosure, one example of such a gas spring assembly will now be described in connection with FIGS. 2-6. As shown therein, a gas spring assembly 200, such as may be suitable for use as one or more of gas spring assemblies 102 in FIG. 1, for example, is shown as having a longitudinally-extending axis AX (FIG. 3) and can include one or more end members, such as an end member 202 and an end member 204 that is spaced longitudinally from end member 202. A flexible spring member 206 can extend peripherally around axis AX and can be secured between the end members in a substantially fluid-tight manner such that a spring chamber 208 (FIG. 3) is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 2-6, for example, end member 202 can be secured on or along a first or upper structural component USC, such as associated vehicle body BDY in FIG. 1, for example, and can be secured thereon in any suitable manner. For example, one or more securement devices 210, such as mounting studs, for example, can be included along end member 202. In some cases, the one or more securement devices (e.g., the mounting studs) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more securement devices 212, such as threaded nuts, for example. As an alternative to one or more of securement devices 210, one or more threaded passages (e.g., blind passages and/or through passages) could be used in conjunction with a corresponding number of one or more threaded fasteners.

Additionally, a fluid communication port, such as a transfer passage 214, for example, can optionally be provided to permit fluid communication with spring chamber 208, such as may be used for transferring pressurized gas into and/or out of the spring chamber, for example. In the exemplary embodiment shown, transfer passage 214 extends through at least one of securement devices 210 and is in fluid communication with spring chamber 208. It will be appreciated, however, that any other suitable fluid communication arrangement could alternately be used.

End member assembly 204 can be secured on or along a second or lower structural component LSC, such as an axle AXL in FIG. 1, for example, in any suitable manner. As one example, lower structural component LSC could include one or more mounting holes HLS extending therethrough. In such case, a securement device 216, such as a threaded fastener, for example, could extend through one of mounting holes HLS and threadably engage end member 204 or a component thereof to secure the end member on or along the lower structural component.

Flexible spring member 206 can be of any suitable size, shape, construction and/or configuration. As one example, flexible spring member 206 can include a flexible wall 218 that is at least partially formed from one or more layers or plies of elastomeric material (e.g., natural rubber, synthetic rubber and/or thermoplastic elastomer) and can optionally include one or more plies or layers of filament reinforcing material. Flexible wall 218 is shown extending in a longitudinal direction between opposing ends 220 and 222. In some cases, flexible spring member 206 can include a mounting bead disposed along either one or both of ends 220 and 222 of the flexible wall. In the arrangement shown in FIGS. 2-6, for example, mounting beads 224 and 226 are shown as being respectively disposed along ends 220 and 222. In some cases, the mounting beads can, optionally, include a reinforcing element 228, such as an endless, annular bead wire, for example, that is substantially entirely embedded within the corresponding mounting bead.

It will be appreciated that the one or more end members can be of any suitable type, kind, construction and/or configuration, and can be operatively connected or otherwise secured to the flexible spring member in any suitable manner. In the arrangement shown in FIGS. 2-6, for example, end member 202 is of a type commonly referred to as a bead plate and is secured to end 220 of flexible wall 218 using a crimped-edge connection in which an outer peripheral edge 230 of end member 202 is crimped or otherwise deformed around at least a portion of at least mounting bead 224 such that a substantially fluid-tight seal is formed therebetween.

Additionally, in the arrangement shown in FIGS. 2-6, end member 204 is shown as being of a type commonly referred to as a piston (or a roll-off piston). End member 204 has an outer surface 232 that abuttingly engages flexible spring member 206 such that a rolling lobe 234 is formed along flexible wall 218. As gas spring assembly 200 is displaced between compressed and extended conditions, rolling lobe 234 is displaced along outer surface 232 in a generally conventional manner. Additionally, it will be appreciated that the exterior of the end member can have any suitable size, shape and/or configuration, such as may be useful to provide one or more desired performance characteristics, for example.

Figure 3:
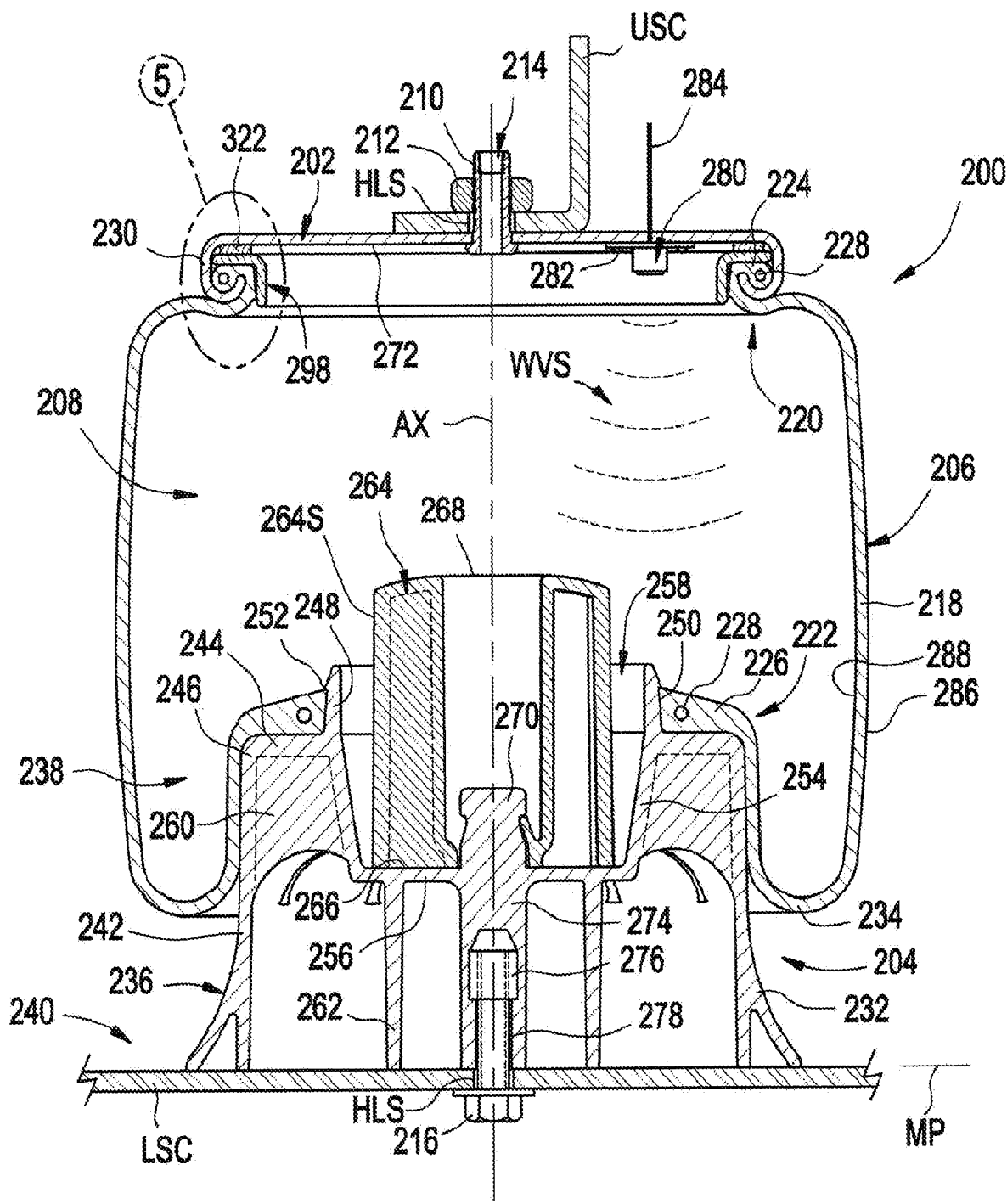
FIG. 3 is a cross-sectional side view of the gas spring assembly in FIG. 2 taken from along line 3-3 therein.

As identified in FIG. 3, end member 204 includes an end member body 236 and extends from along a first or upper end 238 toward a second or lower end 240 that is spaced longitudinally from end 238. Body 236 includes a longitudinally-extending outer side wall 242 that extends peripherally about axis AX and at least partially defines outer surface 232. An end wall 244 is disposed transverse to axis AX and extends radially-inward from along a shoulder portion 246, which is disposed along the outer side wall toward end 238. Body 236 also includes an inner side wall 248 that extends longitudinally-outward beyond end wall 244 and peripherally about axis AX. Inner side wall 248 has an outer surface 250 that is dimensioned to receive end 222 of flexible wall 206 such that a substantially fluid-tight seal can be formed therebetween. In some cases, a retaining ridge 252 can project radially-outward from along inner side wall 248 and can extend peripherally along at least a portion thereof.

In some cases, body 236 can also include an inner side wall 254 that extends longitudinally-inward into the body from along end wall 244. Inner side wall 254 can terminate at a bottom wall 256 that is approximately planar and can be disposed transverse to axis AX such that inner side wall 254 and bottom wall 256 at least partially define a cavity 258 within body 236. In some cases, one or more bridge walls 260 can, optionally, extend between and operatively interconnect outer side wall 242 and inner side wall 254.

An inner support wall 262 can be disposed radially-inward from outer side wall 242 and can extend peripherally about axis AX. In some cases, inner support wall 262 can form a hollow column-like structure that projects from along bottom wall 256 in a longitudinal direction toward end 240. In some cases, the distal end (not numbered) of outer side wall 242 and/or the distal end (not numbered) of inner support wall 262 can at least partially define a mounting plane MP formed along end 240 of the end member body. In this manner, body 236 can be supported, at least in part, by outer side wall 242 and/or inner support wall 262, such as on or along an associated structural member (e.g., lower structural component LSC in FIGS. 2-4).

Figure 4:
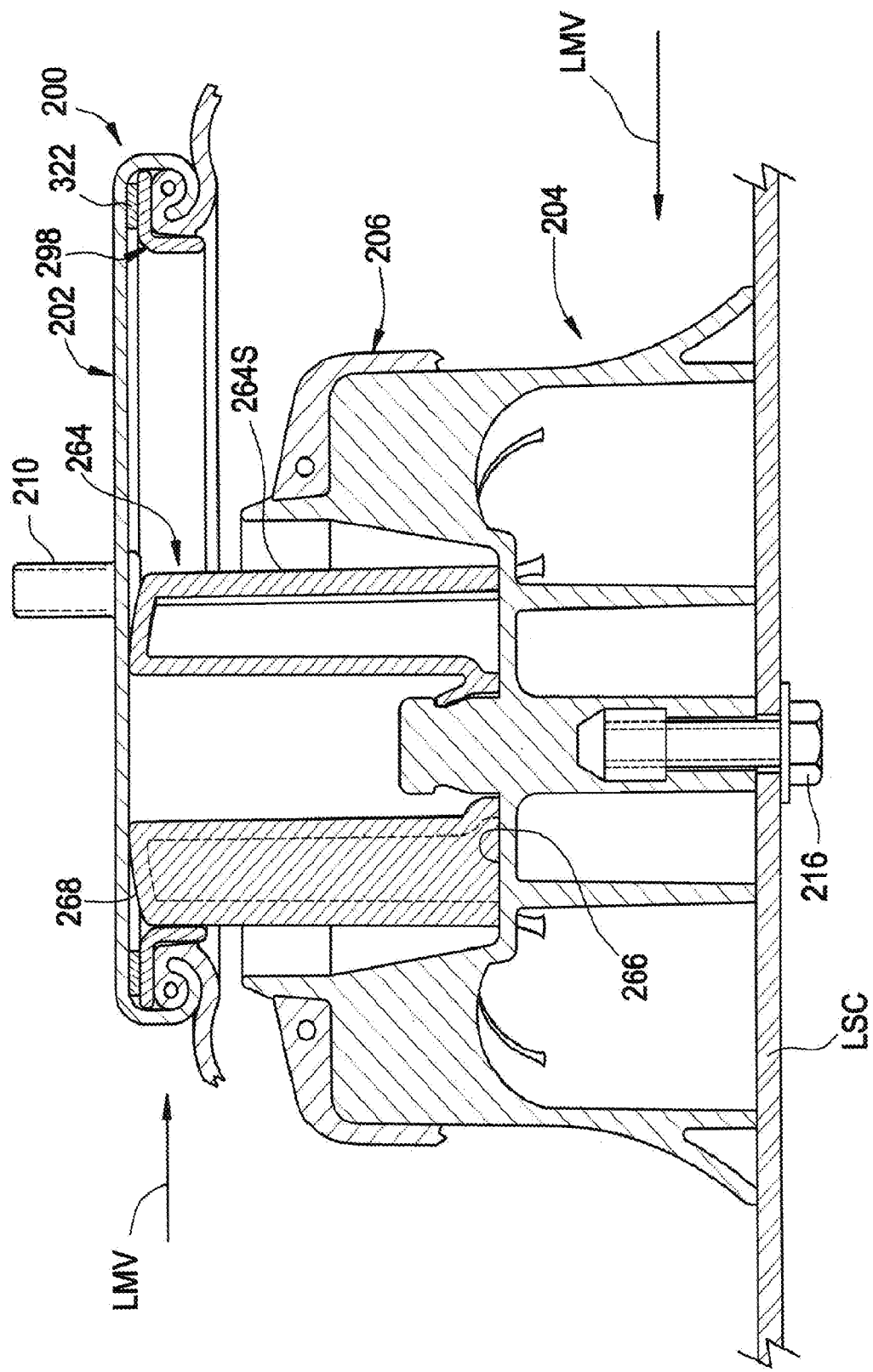
FIG. 4 is a cross-sectional side view of a portion of the gas spring assembly in FIGS. 2 and 3 shown in a full jounce condition and undergoing lateral displacement.
Figure 5:
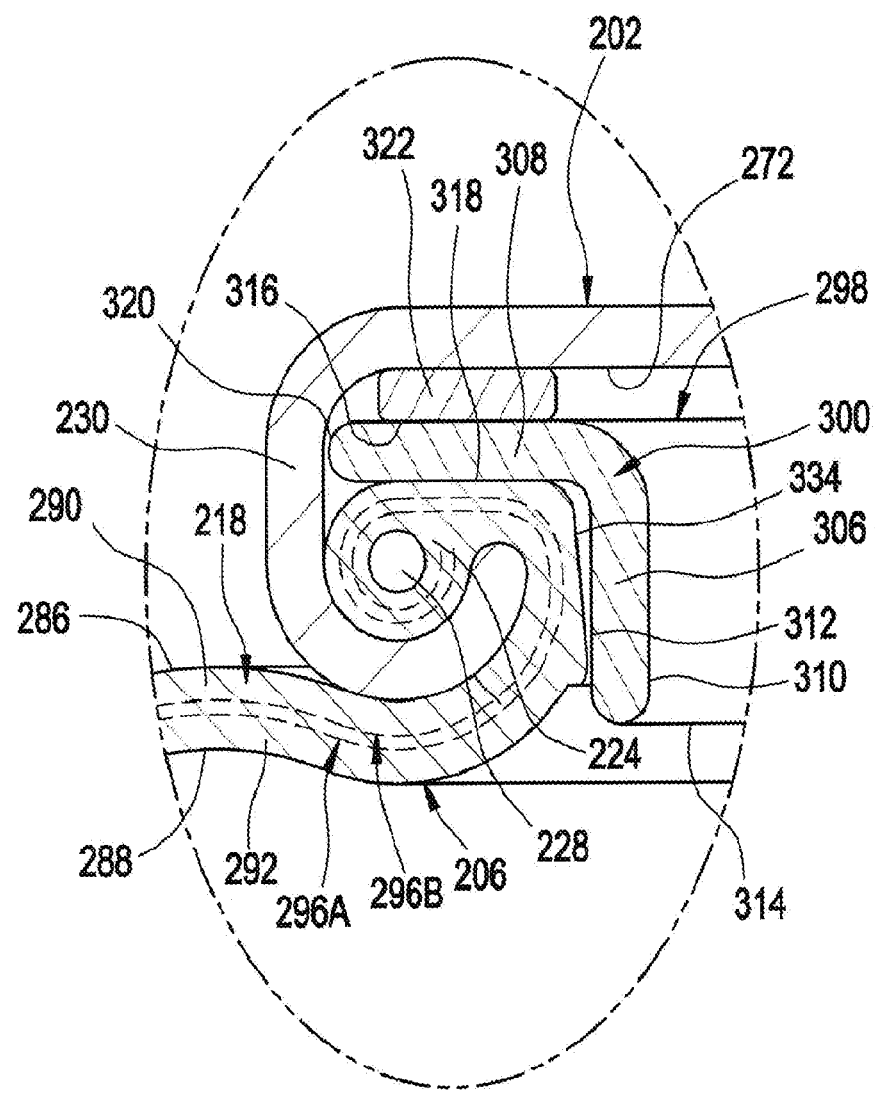
FIG. 5 is an enlarged portion of the gas spring assembly in FIGS. 2-4 that is identified as Detail 5 in FIG. 3.

A gas spring assembly in accordance with the subject matter of the present disclosure can also include a jounce bumper that is supported on or along one of the end members and dimensioned to abuttingly engage the other of the end members of the gas spring assembly. In such cases, axially applied loads or forces can be transmitted from one end member to the other member through abutting engagement with the jounce bumper. As one example, gas spring assembly 200 can include a jounce bumper 264 that is shown as being supported on end member 204. Jounce bumper 264 can include an outer side surface 264S that extends longitudinally between a base end surface 266 and a distal end surface 268. Base end surface 266 can be disposed in abutting engagement along bottom wall 256 of end member body 236 and secured thereto in a suitable manner, such as by way of a snap-fit engagement with a bumper mount 270 disposed on or along end member body 236. In such cases, distal end surface 268 is disposed in facing relation to end member 202. As is shown in FIG. 4, distal end surface 268 can abuttingly engage an inside surface 272 of end member 202 as gas spring assembly 200 undergoes full jounce conditions. Under such conditions, loads and/or forces can be reacted, communicated or otherwise transferred between end members 202 and 204 and the associated mounting structures through jounce bumper 264.

Body 236 can also include a central wall 274 that is disposed radially-inward from inner support wall 262 and forms a post-like structure that projects from along bottom wall 256 in a direction toward end 240. In some cases, central wall 274 can terminate in approximate alignment with mounting plane MP, such as is illustrated in FIG. 3, for example. End member 204 can optionally include one or more features or components suitable for use in securing the end member on or along an associated structural component. As one example, a securement device 276, such as a threaded insert, for example, can be molded into or otherwise captured and retained within central wall 274 and can be dimensioned to receivingly engage a complementary securement device (e.g., securement device 216) for securement of the end member on or along the associate structural component (e.g., lower structural component LSC). In some cases, a longitudinally-extending passage 278 can extend into central wall 274 from along mounting plane MP such that the complementary securement device can reach and engage securement device 276 or another suitable feature.

In some cases, a height or distance sensing device 280 can be, optionally, included, such as is shown in FIG. 3, for example. It will be appreciated that such a height or distance sensing device can be supported on or along an end member (e.g., one of end members 202 and 204) in any suitable manner. As one example, height sensing device 280 can be disposed within spring chamber 208 along end member 202 and can be secured thereto using suitable securement devices 282. Height sensing device 280 can be of any suitable type, kind and/or construction, such as an ultrasonic sensor that transmits and receives ultrasonic waves WVS (FIG. 3), for example. Additionally, it will be appreciated that height sensing device 280 can be connected to other systems and/or components of a vehicle suspension system in any suitable manner. As shown in FIG. 3, height sensing device 280 includes a lead or connection 284 that can be used for such communication purposes, such as is indicated by leads 128 of control system 120 in FIG. 1, for example.

Additionally, as indicated above, flexible wall 218 of flexible spring member 206 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 218 can include an outer surface 286 and an inner surface 288, which can at least partially define spring chamber 208. Additionally, as identified in FIG. 4, flexible wall 218 can include an outer or cover ply 290 that at least partially forms outer surface 286, an inner or liner ply 292 that at least partially forms inner surface 288, and one or more reinforcing plies disposed between outer and inner surfaces 286 and 288. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Figure 2:
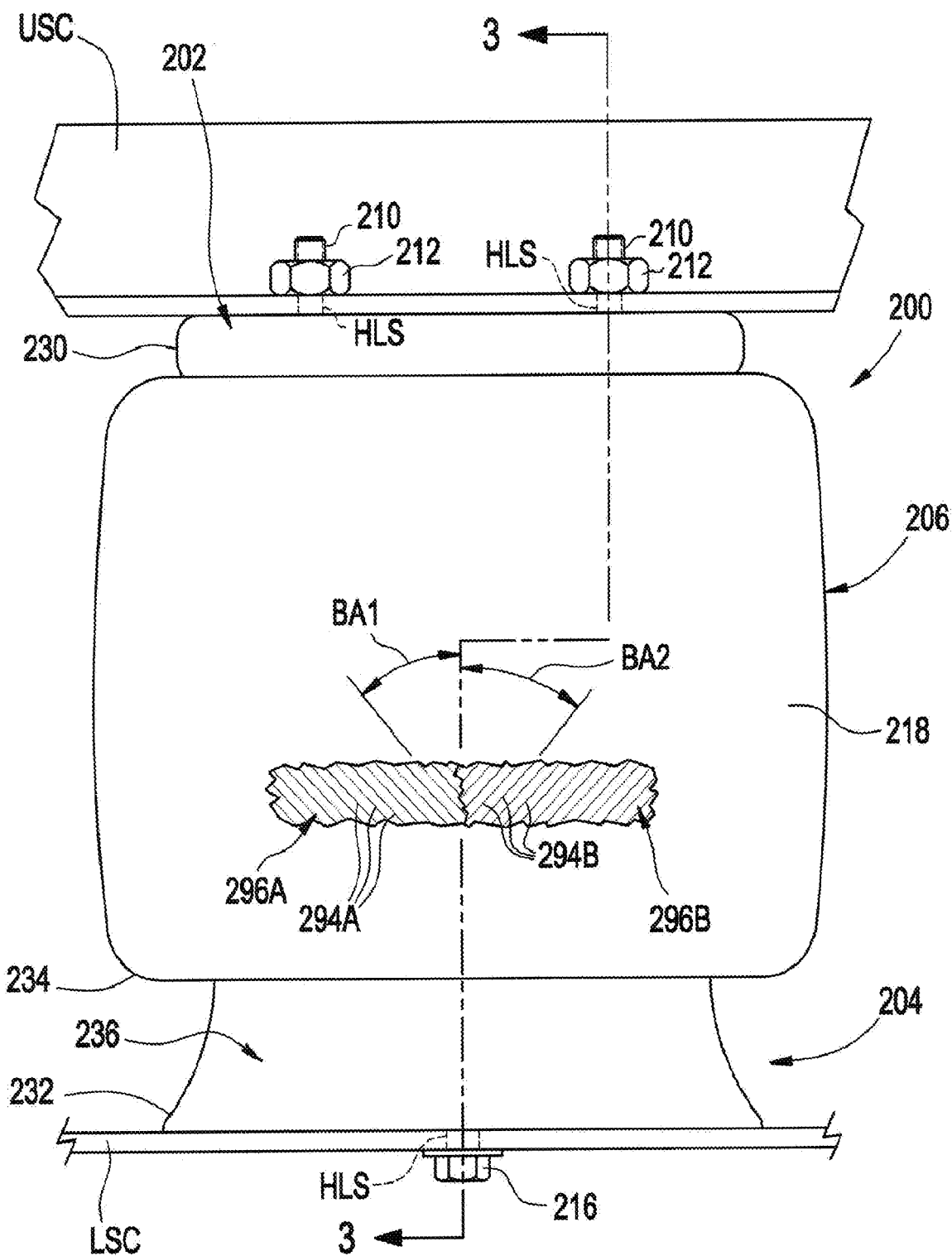
FIG. 2 is a front elevation view of one example of a gas spring assembly in accordance with the subject matter of the present disclosure.

Additionally, it will be appreciated that the one or more lengths of filament material, if provided, can be oriented in any suitable manner. As one example, flexible wall 218 is shown in FIG. 2 as including a plurality of filament segments 294A of one reinforcing ply 296A disposed at one bias angle BA1 (FIG. 2) and a plurality of filament segments 294B of another reinforcing ply 296B disposed another bias angle BA2 (FIG. 2). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 2 by reference dimensions BA1 and BA2, for example.

Figure 6:
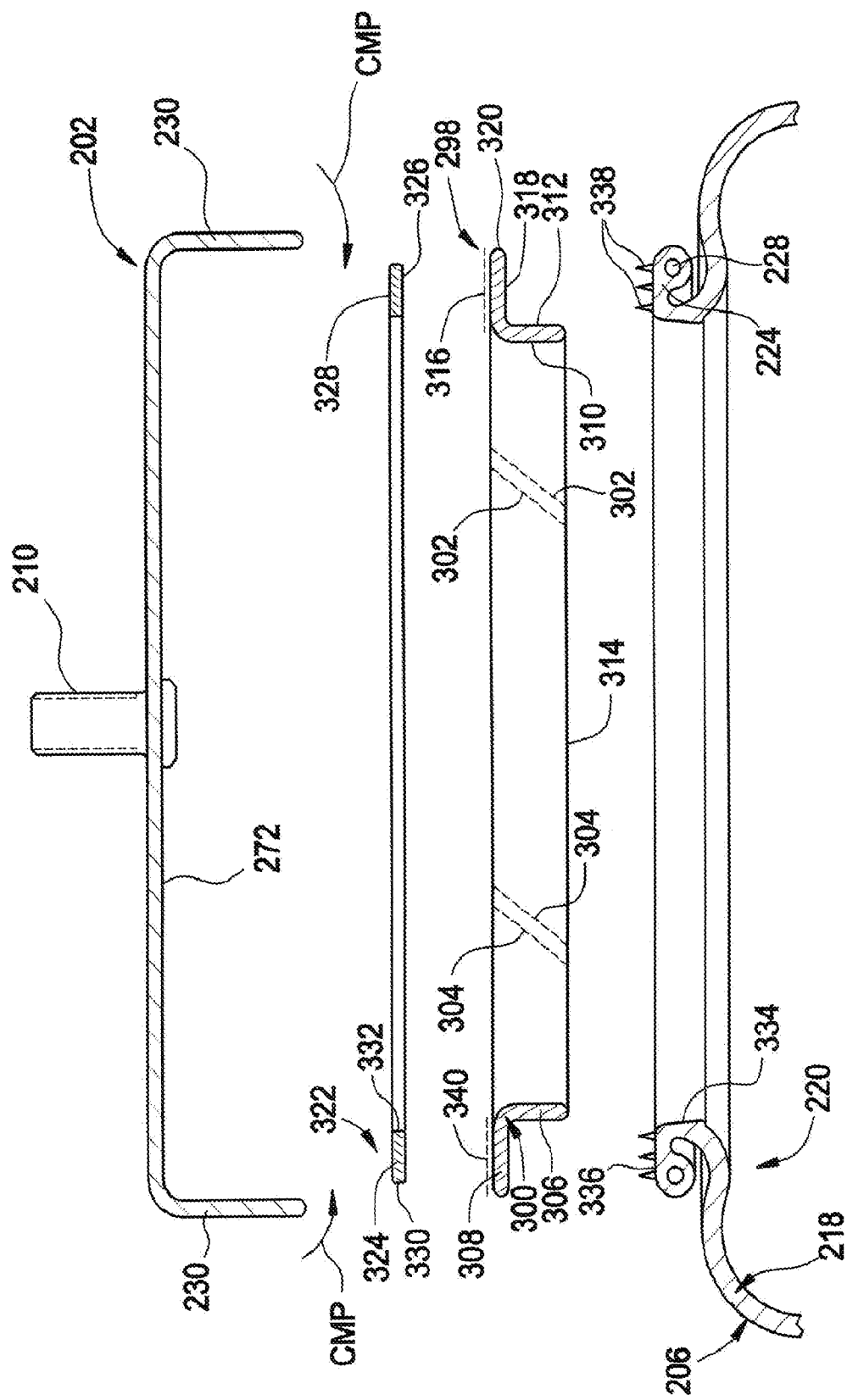
FIG. 6 is an exploded view of a portion of the gas spring assembly in FIGS. 2-5 shown prior to assembly.

A gas spring assembly according to the subject matter of the present disclosure can also include a bead guard disposed along one or more mounting beads or other interior surfaces of the flexible spring member of the gas spring assembly. It will be appreciated that bead guards in accordance with the subject matter of the present disclosure can be of any suitable size, shape, construction and/or configuration, and can include any suitable number of walls and/or wall portions. As one example, gas spring assembly 200 is shown in FIGS. 3-6 as including a bead guard 298 disposed along end 220 of flexible spring member 206. Bead guard 298 is shown as including a bead guard wall 300 that extends peripherally about axis AX. In a preferred arrangement, bead guard wall 300 can extend substantially continuously about the axis to at least partially form an annular construction. In other cases, bead guard wall 300 can include opposing edges 302 that at least partially form a split-ring construction of the bead guard. In still other cases, two or more bead guard walls can be supported along the end of the flexible spring member that together form a bead guard or bead guard assembly. Such a construction is represented in FIG. 6 by edges 304 that together with edges 302 can at least partially form a plurality of bead guard walls.

In the exemplary arrangement shown in FIGS. 3-6, bead guard wall 300 can include a guard wall portion 306 and a mounting wall portion 308. Guard wall portion 306 can include an inside surface 310 and an outside surface 312 facing radially outward relative to inside surface 310. In some cases, the guard wall portion can extend longitudinally from one edge to an opposing edge. In other cases, guard wall portion 306 can extend longitudinally from an edge 314 and operatively connect with mounting wall portion 308. In such case, mounting wall portion 308 can include a surface 316 and a surface 318 facing away from surface 316. Mounting wall portion 308 can be oriented transverse to axis AX and can extend radially outward beyond guard wall portion 306 to an outer peripheral edge 320.

To aid in maintaining spring chamber 208 as a substantially fluid-tight construction, or for other reasons, gas spring assembly 200 can, optionally, include a sealing element 322 sealingly disposed between end member 202 and bead guard 298. It will be appreciated that sealing element 322 can be of any suitable size, shape, configuration and/or construction, and that the sealing element can for formed from any suitable material or combination of materials, such as natural rubber, synthetic rubber and/or thermoplastic elastomer, for example. As one example, sealing element 322 can include a sealing element wall 324 that includes a side surface 326 and a side surface 328 facing opposite side surface 326. Sealing element wall 324 as well as side surfaces 326 and 328 thereof can extend between an outer peripheral edge 330 and an inner peripheral edge 332.

In assembling gas spring assembly 200, bead guard 298 can be positioned on or along end 220 of flexible spring member 206 such that outer surface 312 of guard wall portion 306 is disposed in facing relation with a bead inner surface 334 of mounting bead 224. In such a position, surface 318 of mounting wall portion 308 is disposed in facing relation with a bead end surface 336. In some cases, one or more sealing features 338 can be disposed on or along bead end surface 336 to promote sealing engagement between the mounting bead and the bead guard. As one example, sealing features 338 can take the form of one or more annular rings having a somewhat tapered or triangular cross-sectional shape that extend around axis AX along bead end surface 336, such as is shown in FIG. 6, for example.

Additionally, in assembling gas spring assembly 200, end member 202 can be positioned on or along end 220 of flexible spring member 206 such that surface 272 is disposed in facing relation with surface 316 of mounting wall portion 308. To aid in maintaining spring chamber 208 as a substantially fluid-tight construction, or for other reasons, sealing element 322 can be disposed between end member 202 and bead guard 298. In some cases, the sealing element can take the form of a liquid or semi-solid material that is applied or otherwise disposed on, along or otherwise between surface 272 of end member 202 and surface 316 of mounting wall portion 308. In other cases, a sealing element, such as sealing element 332, for example, can be disposed between the end member and the bead guard prior to assembly. For example, sealing element 332 could be secured on or along surface 316 of mounting wall portion 308 using an adhesive, such as is represented in FIG. 6 by dashed lines 340. Outer peripheral edge 230 of end member 202 can then be crimped or otherwise deformed around at least a portion of mounting bead 224, as is represented by arrows CMP in FIG. 6, such that sealing element 332 (if provided) and mounting wall portion 308 are compressively captured between the end member and mounting bead of the flexible spring member.

During use, guard wall portion 306 extends axially along at least a portion of mounting bead 224 with surface 312 disposed in facing relation to the mounting bead and surface 310 facing radially inward. Upon lateral displacement during a full or at least partial jounce condition, such as is represented in FIG. 4 by arrows LMV, for example, outer side wall 264S contacts surface 310 of bead guard 298 instead of contacting the mounting bead, as would normally occur with conventional gas spring constructions.

Another example of a gas spring assembly in accordance with the subject matter of the present disclosure will now be described in connection with FIGS. 7-11. As shown therein, a gas spring assembly 400, such as may be suitable for use as one or more of gas spring assemblies 102 in FIG. 1, for example, is shown as having a longitudinally-extending axis AX (FIG. 8) and can include one or more end members, such as an end member 402 and an end member 404 that is spaced longitudinally from end member 402. A flexible spring member 406 can extend peripherally around axis AX and can be secured between the end members in a substantially fluid-tight manner such that a spring chamber 408 (FIG. 8) is at least partially defined therebetween.

Gas spring assembly 400 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 7-11, for example, end member 402 can be secured on or along a first or upper structural component USC, such as associated vehicle body BDY in FIG. 1, for example, and can be secured thereon in any suitable manner. For example, one or more securement devices 410, such as mounting studs, for example, can be included along end member 402. In some cases, the one or more securement devices (e.g., the mounting studs) can project outwardly from end member 402 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more securement devices 412, such as threaded nuts, for example. As an alternative to one or more of securement devices 410, one or more threaded passages (e.g., blind passages and/or through passages) could be used in conjunction with a corresponding number of one or more threaded fasteners.

Additionally, a fluid communication port, such as a transfer passage 414, for example, can optionally be provided to permit fluid communication with spring chamber 408, such as may be used for transferring pressurized gas into and/or out of the spring chamber, for example. In the exemplary embodiment shown, transfer passage 414 extends through at least one of securement devices 410 and is in fluid communication with spring chamber 408. It will be appreciated, however, that any other suitable fluid communication arrangement could alternately be used.

End member assembly 404 can be secured on or along a second or lower structural component LSC, such as an axle AXL in FIG. 1, for example, in any suitable manner. As one example, lower structural component LSC could include one or more mounting holes HLS extending therethrough. In such case, a securement device 416, such as a threaded fastener, for example, could extend through one of mounting holes HLS and threadably engage end member 404 or a component thereof to secure the end member on or along the lower structural component.

Flexible spring member 406 can be of any suitable size, shape, construction and/or configuration. As one example, flexible spring member 406 can include a flexible wall 418 that is at least partially formed from one or more layers or plies of elastomeric material (e.g., natural rubber, synthetic rubber and/or thermoplastic elastomer) and can optionally include one or more plies or layers of filament reinforcing material. Flexible wall 418 is shown extending in a longitudinal direction between opposing ends 420 and 422. In some cases, flexible spring member 406 can include a mounting bead disposed along either one or both of ends 420 and 422 of the flexible wall. In the arrangement shown in FIGS. 7-11, for example, mounting beads 424 and 426 are shown as being respectively disposed along ends 420 and 422. In some cases, the mounting beads can, optionally, include a reinforcing element 428, such as an endless, annular bead wire, for example, that is substantially entirely embedded within the corresponding mounting bead.

It will be appreciated that the one or more end members can be of any suitable type, kind, construction and/or configuration, and can be operatively connected or otherwise secured to the flexible spring member in any suitable manner. In the arrangement shown in FIGS. 7-11, for example, end member 402 is of a type commonly referred to as a bead plate and is secured to end 420 of flexible wall 418 using a crimped-edge connection in which an outer peripheral edge 430 of end member 402 is crimped or otherwise deformed around at least a portion of at least mounting bead 424 such that a substantially fluid-tight seal is formed therebetween.

Additionally, in the arrangement shown in FIGS. 7-11, end member 404 is shown as being of a type commonly referred to as a piston (or a roll-off piston). End member 404 has an outer surface 432 that abuttingly engages flexible spring member 406 such that a rolling lobe 434 is formed along flexible wall 418. As gas spring assembly 400 is displaced between compressed and extended conditions, rolling lobe 434 is displaced along outer surface 432 in a generally conventional manner. Additionally, it will be appreciated that the exterior of the end member can have any suitable size, shape and/or configuration, such as may be useful to provide one or more desired performance characteristics, for example.

Figure 8:
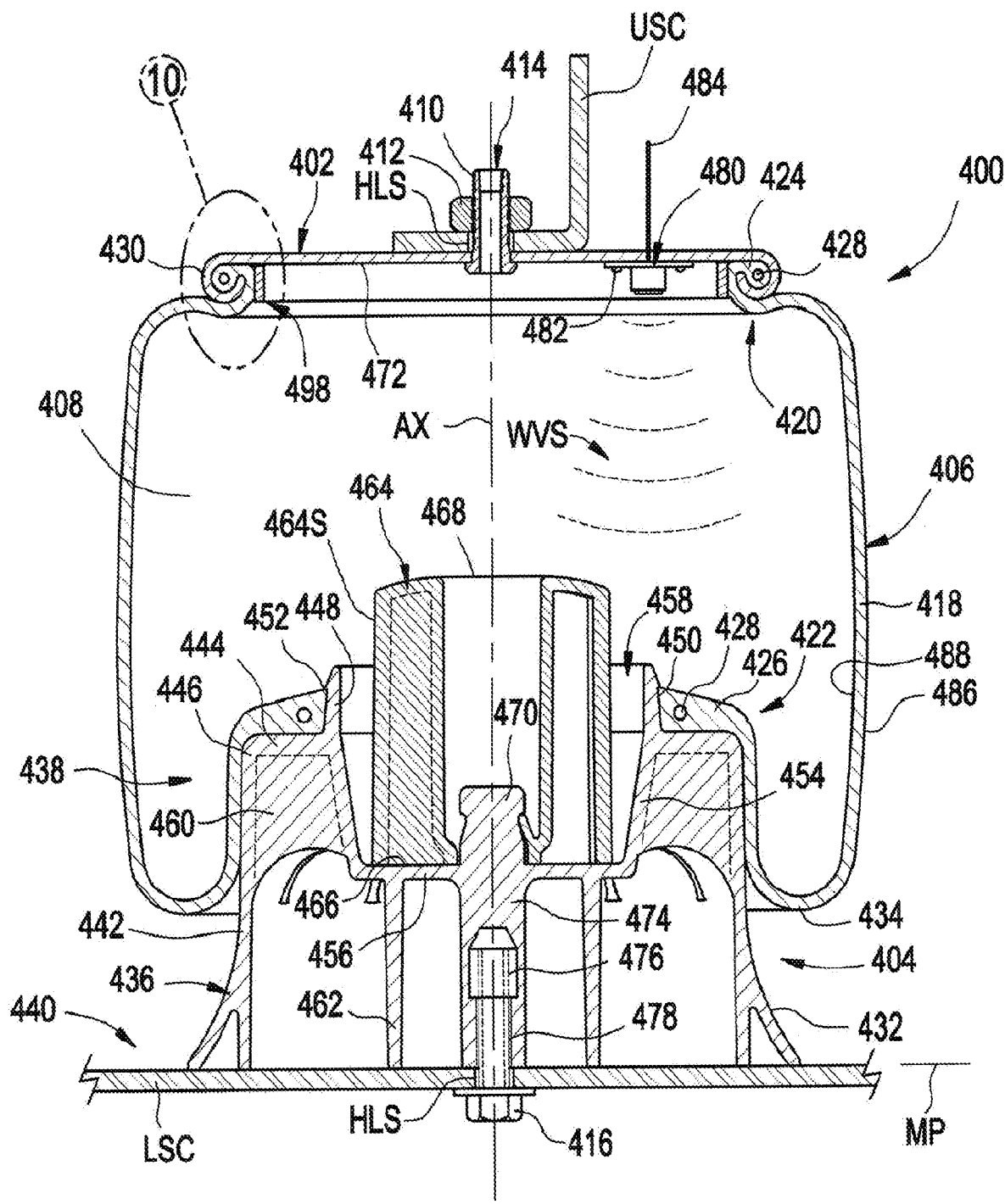
FIG. 8 is a cross-sectional side view of the gas spring assembly in FIG. 7 taken from along line 8-8 therein.

As identified in FIG. 8, end member 404 includes an end member body 436 and extends from along a first or upper end 438 toward a second or lower end 440 that is spaced longitudinally from end 438. Body 436 includes a longitudinally-extending outer side wall 442 that extends peripherally about axis AX and at least partially defines outer surface 432. An end wall 444 is disposed transverse to axis AX and extends radially-inward from along a shoulder portion 446, which is disposed along the outer side wall toward end 438. Body 436 also includes an inner side wall 448 that extends longitudinally-outward beyond end wall 444 and peripherally about axis AX. Inner side wall 448 has an outer surface 450 that is dimensioned to receive end 422 of flexible wall 406 such that a substantially fluid-tight seal can be formed therebetween. In some cases, a retaining ridge 452 can project radially-outward from along inner side wall 448 and can extend peripherally along at least a portion thereof.

In some cases, body 436 can also include an inner side wall 454 that extends longitudinally-inward into the body from along end wall 444. Inner side wall 454 can terminate at a bottom wall 456 that is approximately planar and can be disposed transverse to axis AX such that inner side wall 454 and bottom wall 456 at least partially define a cavity 458 within body 436. In some cases, one or more bridge walls 460 can, optionally, extend between and operatively interconnect outer side wall 442 and inner side wall 454.

An inner support wall 462 can be disposed radially-inward from outer side wall 442 and can extend peripherally about axis AX. In some cases, inner support wall 462 can form a hollow column-like structure that projects from along bottom wall 456 in a longitudinal direction toward end 440. In some cases, the distal end (not numbered) of outer side wall 442 and/or the distal end (not numbered) of inner support wall 462 can at least partially define a mounting plane MP formed along end 440 of the end member body. In this manner, body 436 can be supported, at least in part, by outer side wall 442 and/or inner support wall 462, such as on or along an associated structural member (e.g., lower structural component LSC in FIGS. 7-9).

Figure 9:
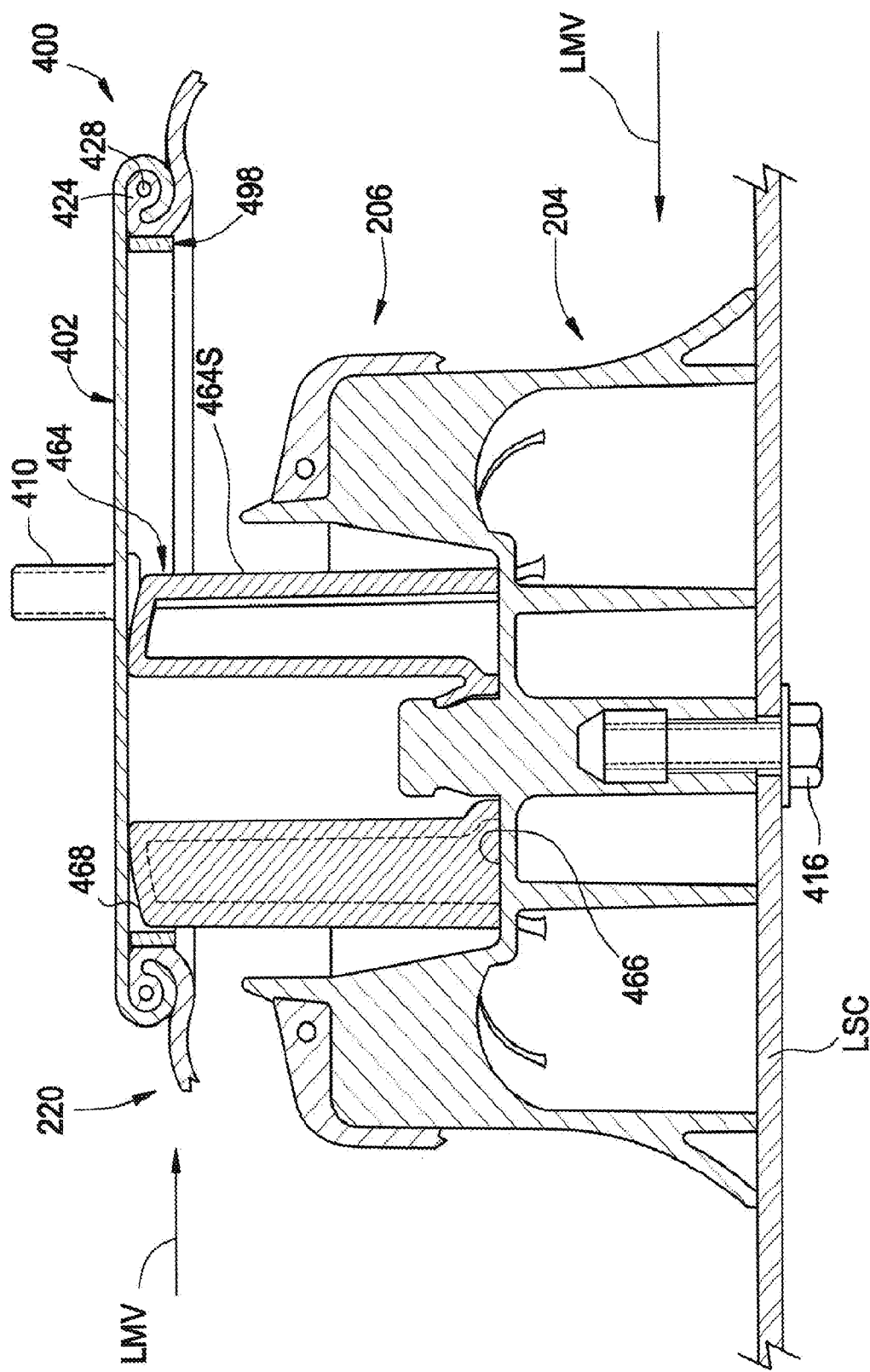
FIG. 9 is a cross-sectional side view of a portion of the gas spring assembly in FIGS. 7 and 8 shown in a full jounce condition and undergoing lateral displacement.

A gas spring assembly in accordance with the subject matter of the present disclosure can also include a jounce bumper that is supported on or along one of the end members and dimensioned to abuttingly engage the other of the end members of the gas spring assembly. In such cases, axially applied loads or forces can be transmitted from one end member to the other member through abutting engagement with the jounce bumper. As one example, gas spring assembly 400 can include a jounce bumper 464 that is shown as being supported on end member 404. Jounce bumper 464 can include an outer side surface 464S that extends longitudinally between a base end surface 466 and a distal end surface 468. Base end surface 466 can be disposed in abutting engagement along bottom wall 456 of end member body 436 and secured thereto in a suitable manner, such as by way of a snap-fit engagement with a bumper mount 470 disposed on or along end member body 436. In such cases, distal end surface 468 is disposed in facing relation to end member 402. As is shown in FIG. 9, distal end surface 468 can abuttingly engage an inside surface 472 of end member 402 as gas spring assembly 400 undergoes full jounce conditions. Under such conditions, loads and/or forces can be reacted, communicated or otherwise transferred between end members 402 and 404 and the associated mounting structures through jounce bumper 464.

Body 436 can also include a central wall 474 that is disposed radially-inward from inner support wall 462 and forms a post-like structure that projects from along bottom wall 456 in a direction toward end 440. In some cases, central wall 474 can terminate in approximate alignment with mounting plane MP, such as is illustrated in FIG. 8, for example. End member 404 can optionally include one or more features or components suitable for use in securing the end member on or along an associated structural component. As one example, a securement device 476, such as a threaded insert, for example, can be molded into or otherwise captured and retained within central wall 474 and can be dimensioned to receivingly engage a complementary securement device (e.g., securement device 416) for securement of the end member on or along the associate structural component (e.g., lower structural component LSC). In some cases, a longitudinally-extending passage 478 can extend into central wall 474 from along mounting plane MP such that the complementary securement device can reach and engage securement device 476 or another suitable feature.

In some cases, a height or distance sensing device 480 can be, optionally, included, such as is shown in FIG. 8, for example. It will be appreciated that such a height or distance sensing device can be supported on or along an end member (e.g., one of end members 402 and 404) in any suitable manner. As one example, height sensing device 480 can be disposed within spring chamber 408 along end member 402 and can be secured thereto using suitable securement devices 482. Height sensing device 480 can be of any suitable type, kind and/or construction, such as an ultrasonic sensor that transmits and receives ultrasonic waves WVS (FIG. 8), for example. Additionally, it will be appreciated that height sensing device 480 can be connected to other systems and/or components of a vehicle suspension system in any suitable manner. As shown in FIG. 8, height sensing device 480 includes a lead or connection 484 that can be used for such communication purposes, such as is indicated by leads 128 of control system 120 in FIG. 1, for example.

Additionally, as indicated above, flexible wall 418 of flexible spring member 406 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 418 can include an outer surface 486 and an inner surface 488, which can at least partially define spring chamber 408. Additionally, as identified in FIG. 10, flexible wall 418 can include an outer or cover ply 490 that at least partially forms outer surface 486, an inner or liner ply 492 that at least partially forms inner surface 488, and one or more reinforcing plies disposed between outer and inner surfaces 486 and 488. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Figure 7:
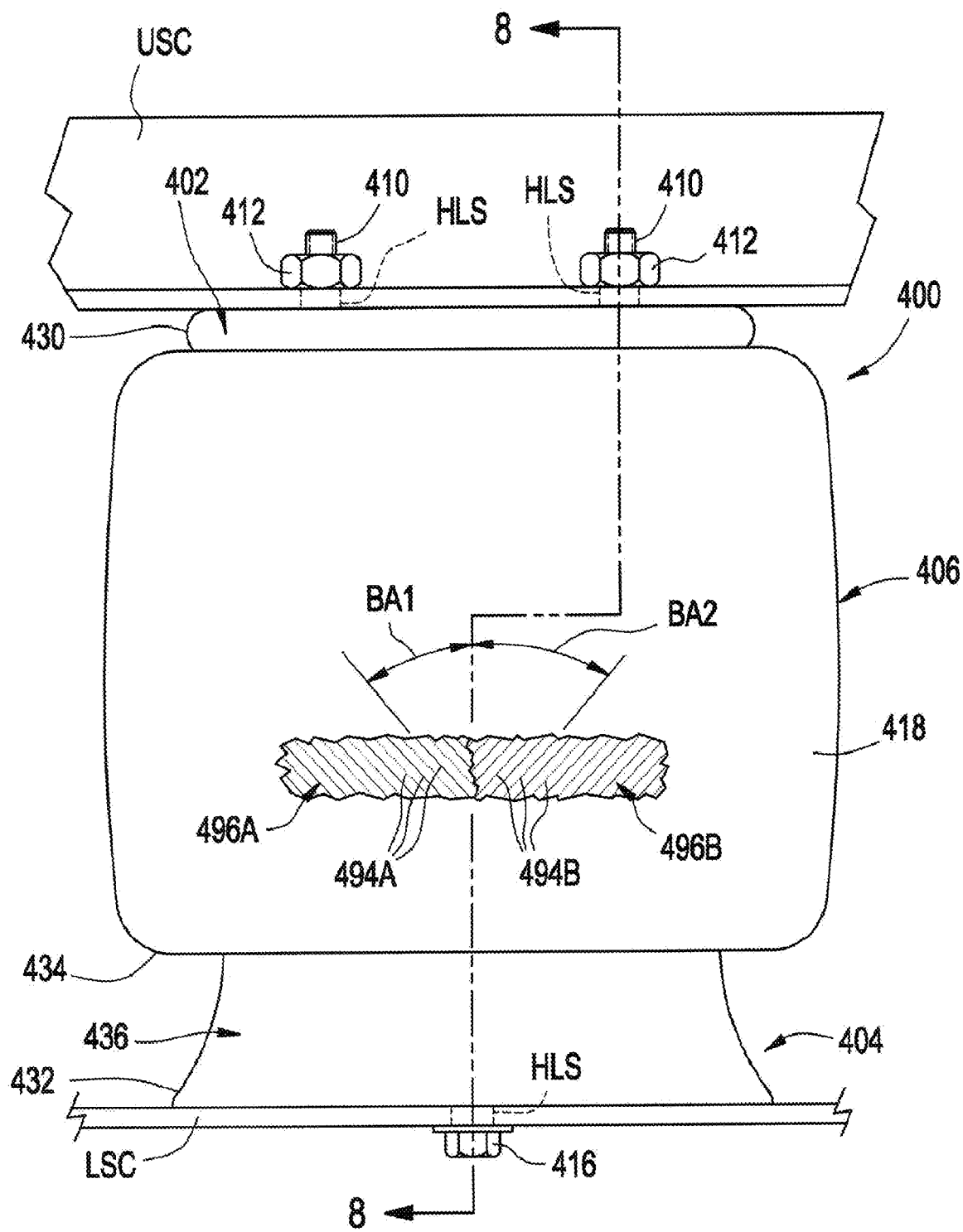
FIG. 7 is a front elevation view of another example of a gas spring assembly in accordance with the subject matter of the present disclosure.

Additionally, it will be appreciated that the one or more lengths of filament material, if provided, can be oriented in any suitable manner. As one example, flexible wall 418 is shown in FIG. 7 as including a plurality of filament segments 494A of one reinforcing ply 496A disposed at one bias angle BA1 (FIG. 7) and a plurality of filament segments 494B of another reinforcing ply 496B disposed another bias angle BA2 (FIG. 7). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 7 by reference dimensions BA1 and BA2, for example.

A gas spring assembly according to the subject matter of the present disclosure can also include a bead guard disposed along one or more mounting beads or other interior surfaces of the flexible spring member of the gas spring assembly. It will be appreciated that bead guards in accordance with the subject matter of the present disclosure can be of any suitable size, shape, construction and/or configuration, and can include any suitable number of walls and/or wall portions. As one example, gas spring assembly 400 is shown in FIGS. 8-11 as including a bead guard 498 disposed along end 420 of flexible spring member 406. Bead guard 498 is shown as including a bead guard wall 500 that extends peripherally about axis AX. In a preferred arrangement, bead guard wall 500 can extend substantially continuously about the axis to at least partially form an annular construction. In other cases, bead guard wall 500 can include opposing edges 502 that at least partially form a split-ring construction of the bead guard. In still other cases, two or more bead guard walls can be supported along the end of the flexible spring member that together form a bead guard or bead guard assembly. Such a construction is represented in FIG. 11 by edges 504 that together with edges 502 can at least partially form a plurality of bead guard walls. In a preferred arrangement, bead guard wall 500 can be at least partially formed from a material or combination of materials at least one of which is comparatively rigid relative to the material of flexible spring member 406. Examples of suitable materials can include metals, such as steel and/or aluminum, and/or polymeric materials, such as fiber-reinforced polypropylene, fiber-reinforced polyamide, unreinforced (i.e., relatively high modulus) polyester, polyethylene, polyamide, polyether or any combination thereof.

Figure 10:
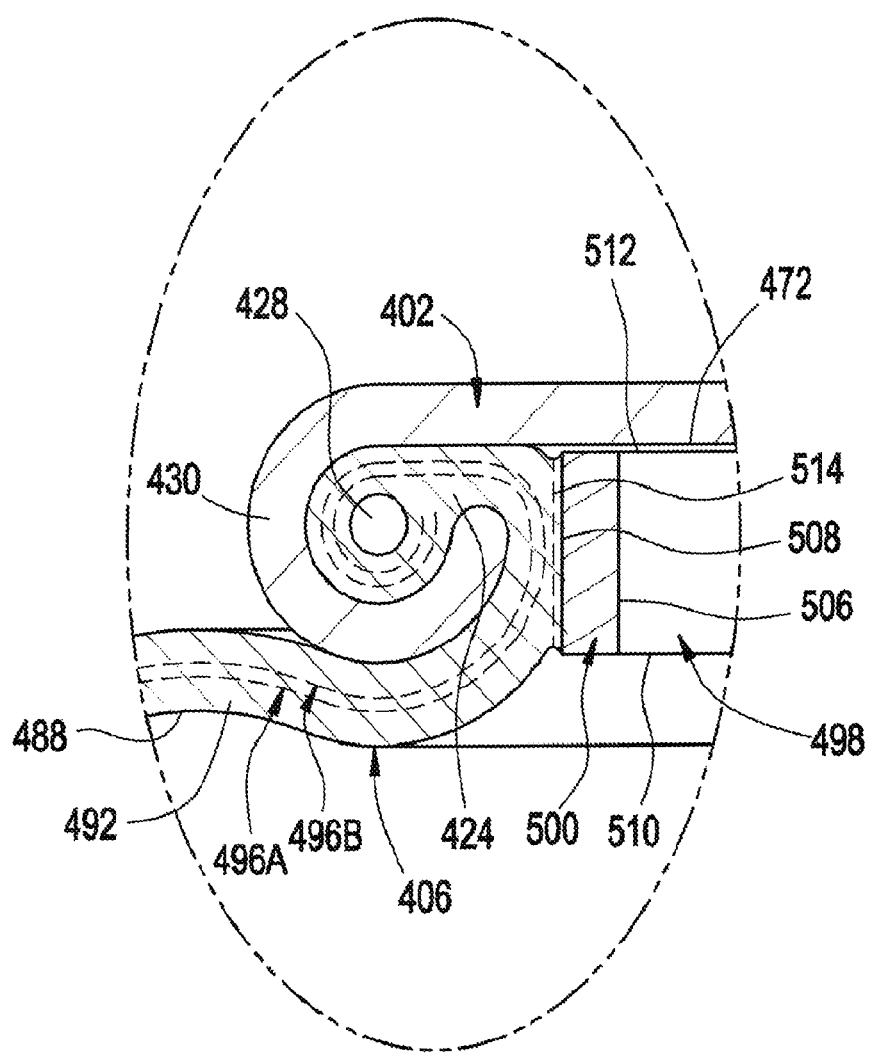
FIG. 10 is an enlarged portion of the gas spring assembly in FIGS. 7-9 that is identified as Detail 10 in FIG. 8.
Figure 11:
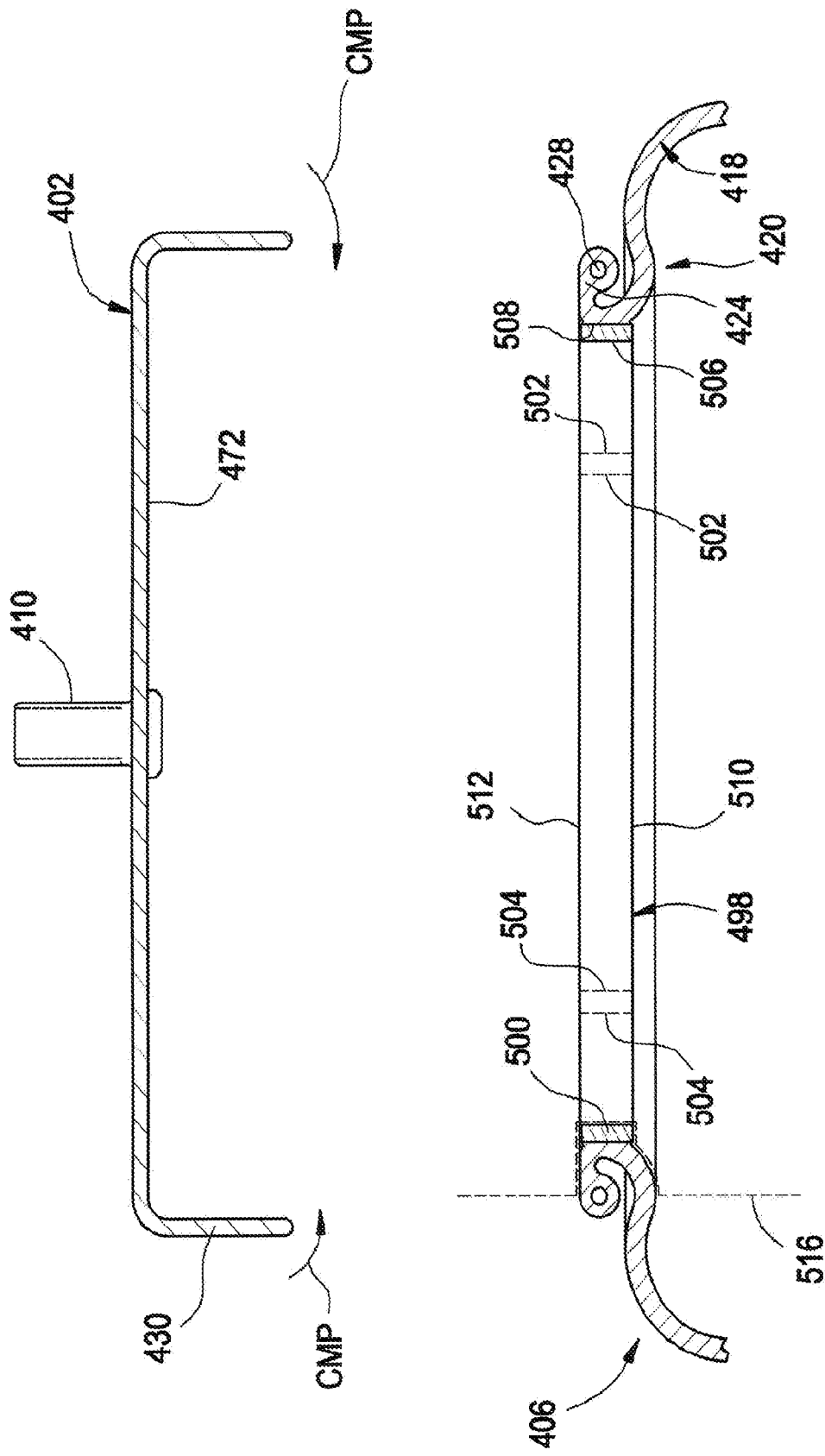
FIG. 11 is an exploded view of a portion of the gas spring assembly in FIGS. 7-10 shown prior to assembly.

In the exemplary arrangement shown in FIGS. 8-11, bead guard wall 500 can include an inside surface 506 and an outside surface 508 facing radially-outward relative to inside surface 506. In some cases, the bead guard wall can extend longitudinally from one edge to an opposing flange or other radial wall portion. In other cases, bead guard wall 500 can extend longitudinally from an edge 510 to an opposing edge 512, such as is shown in FIGS. 8-11, for example. Additionally, in a preferred arrangement, bead guard 500 can be secured on or along a bead inner surface (not numbered) of mounting bead 420 of flexible spring member 406. It will be appreciated that the bead guard can be secured on or along the bead inner surface in any suitable manner. In a preferred arrangement, bead guard 498 can be permanently attached (i.e., inseparable without damage, destruction or material alteration of at least one of the component parts) on or along mounting bead 420, as is represented in FIG. 10 by dashed line 514. It will be appreciated that such a permanent attachment can be formed by way of one or more processes and/or can include the use of one or more treatments and/or materials. As one example, a flowed-material joint or connection (e.g., adhesive) could be used. Additionally, or in the alternative, such processes can include molding, adhering, curing and/or vulcanizing.

In assembling gas spring assembly 400, bead guard 498 can be positioned on or along end 420 of flexible spring member 406 such that outer surface 508 is disposed in facing relation with a bead inner surface (not numbered) of mounting bead 424. In some cases, such an action can be performed with flexible spring member 406 in an uncured condition. In such case, the uncured flexible spring member and bead guard 498 can be inserted into a curing mold or other similar device, which is represented in FIG. 11 by dashed lines 516. In some cases, one or more sealing features (e.g., sealing features 338) can be disposed on or along a bead end surface 518 of mounting bead 424 to promote sealing engagement between the mounting bead and the end member. Additionally, in assembling gas spring assembly 400, end member 402 can be positioned on or along end 420 of flexible spring member 406 such that surface 472 is disposed in facing relation with edge 512 of bead guard wall 500. In some cases, edge 512 can be disposed in abutting engagement with surface 472 of the end member. In other cases, a gap or space can be included between edge 512 and the end member. Outer peripheral edge 430 of end member 402 can then be crimped or otherwise deformed around at least a portion of mounting bead 424, as is represented by arrows CMP in FIG. 11, such that a substantially fluid-tight seal is formed between the end member and the mounting bead of the flexible spring member.

During use, bead guard wall 500 extends axially along at least a portion of mounting bead 424 with surface 508 disposed in facing relation to the mounting bead and surface 510 facing radially inward. Upon lateral displacement during a full or at least partial jounce condition, such as is represented in FIG. 9 by arrows LMV, for example, outer side wall 464S of jounce bumper 464 can contact surface 506 of bead guard 498 instead of contacting the mounting bead, as would normally occur with conventional gas spring constructions.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:
1. A gas spring assembly comprising:
a flexible spring member having a longitudinal axis, said flexible spring member extending peripherally about said longitudinal axis between a first end and a second end spaced longitudinally from said first end such that a spring chamber is at least partially defined by said flexible spring member between said first and second ends, said flexible spring member including a flexible wall at least partially formed from an elastomeric material and a mounting bead disposed along said first end;
a first end member secured across said first end of said flexible spring member in fluid communication with said spring chamber such that a substantially fluid-tight seal is formed therebetween; and,
a bead guard disposed radially inward of said mounting bead and extending longitudinally therealong with said bead guard permanently attached to said mounting bead of said flexible spring member.

2. A gas spring assembly according to claim 1, wherein said bead guard includes a side wall portion with an inner side surface facing radially inward and an outer side surface disposed in facing relation to said mounting bead.

3. A gas spring assembly according to claim 2, wherein said bead guard includes a first annular edge with at least one of said inner side surface and said outer side surface extending axially along said side wall portion from along said first annular edge.

4. A gas spring assembly according to claim 3, wherein said bead guard includes a second annular edge axially offset from said first annular edge with said second annular edge facing toward said first end member.

5. A gas spring assembly according to claim 1, wherein said mounting bead includes an inner surface and said bead guard includes an outer side surface disposed in facing relation to said inner surface of said mounting bead.

6. A gas spring assembly according to claim 5, wherein said mounting bead includes an end surface, and said bead guard includes a side wall portion extending longitudinally along said inner surface of said mounting bead and a mounting wall portion extending radially outward from said side wall portion along said end surface of said mounting bead.

7. A gas spring assembly according to claim 6, wherein said mounting wall portion is disposed between said first end member and said mounting bead.

8. A gas spring assembly according to claim 7 further comprising a sealing element disposed between said mounting wall portion and said first end member such that a substantially fluid-tight seal is formed therebetween.

9. A gas spring assembly according to claim 1 further comprising a second end member secured across said second end of said flexible spring member such that a substantially fluid-tight seal is formed therebetween.

10. A gas spring assembly according to claim 9 further comprising a jounce bumper disposed along said second end member and including an outer side surface and a distal end surface facing away from said second end member such that, upon abutting engagement of said distal end surface with said first end member, said bead guard is disposed between said mounting bead and at least a portion of said outer side surface of said jounce bumper.

11. A gas spring assembly according to claim 1, wherein said bead guard forms a split ring extending between opposing ring edges.

12. A flexible spring member and bead guard assembly comprising:
a flexible spring member having a longitudinal axis and extending peripherally about said longitudinal axis between a first end and a second end spaced longitudinally from said first end, said flexible spring member including a flexible wall at least partially formed from an elastomeric material, and said flexible wall including a mounting bead disposed along said first end, said mounting bead at least partially formed from said elastomeric material of said flexible wall and including an annular reinforcing element at least partially embedded therein; and,
a bead guard disposed along said first end of said flexible spring member with at least a portion of said bead guard disposed radially inward of said mounting bead such that said portion of said bead guard extends longitudinally along said mounting bead and is secured along said mounting bead of said flexible spring member with an outside surface of said bead guard permanently attached to said mounting bead and an inside surface of said bead guard facing radially inward.

13. A flexible spring member and bead guard assembly according to claim 12, wherein said bead guard includes a first edge facing toward said first end of said flexible spring member and a second edge facing toward said second end of said flexible spring member relative to said first edge.

14. A flexible spring member and bead guard assembly according to claim 12, wherein said mounting bead includes an end surface, and said portion of said bead guard extending longitudinally along said mounting bead is permanently attached to said mounting bead along said end surface.

15. A flexible spring member and bead guard assembly according to claim 12, wherein said bead guard forms a split ring extending between opposing ring edges.

16. A gas spring assembly comprising:
a flexible spring member having a longitudinal axis and extending peripherally about said longitudinal axis between a first end and a second end spaced longitudinally from said first end, said flexible spring member including a flexible wall at least partially formed from an elastomeric material and a mounting bead disposed along said first end, said mounting bead including an inner side surface facing radially inward and an end surface facing away from said second end of said flexible spring member;
a first end member including an end member wall with an outer peripheral wall portion disposed radially outward of said mounting bead, said first end member disposed across said first end of said flexible spring member with said outer peripheral wall portion forming a crimped connection around at least a portion of said mounting bead; and,
a bead guard including a side wall portion extending longitudinally and a mounting wall portion extending radially outward from along said side wall portion, said bead guard disposed along said first end of said flexible spring member such that said side wall portion faces radially outward toward inner side surface of said mounting bead and said mounting wall portion is disposed between said first end member and said end surface of said mounting bead with said bead guard permanently attached to said mounting bead of said flexible spring member along at least one of said inner side surface and said end surface thereof.

17. A gas spring assembly according to claim 16 further comprising a sealing element disposed between said mounting wall portion of said bead guard and said first end member such that a substantially fluid-tight seal is formed therebetween.

18. A gas spring assembly according to claim 16, wherein said mounting bead of said flexible spring member includes one or more sealing features projecting outwardly from along said end surface of said mounting bead with said sealing features abuttingly engaging said mounting wall portion of said bead guard.

19. A gas spring assembly according to claim 16, wherein said bead guard forms a split ring extending between opposing ring edges.

20. A gas spring assembly according to claim 16 further comprising:
a second end member secured across said second end of said flexible spring member such that a substantially fluid-tight seal is formed therebetween with said flexible spring member at least partially defining a spring chamber between said first and second end members; and, a jounce bumper disposed along said second end member and including an outer side surface and a distal end surface facing away from said second end member such that, upon abutting engagement of said distal end surface with said first end member, said bead guard is disposed between said mounting bead and at least a portion of said outer side surface of said jounce bumper.

* * * * *